United States Patent [19]
Boucher et al.

[11] 3,849,008
[45] Nov. 19, 1974

[54] SADDLE SUPPORT SYSTEM

[75] Inventors: Raymond W. Boucher, Dothan, Ala.; Robert Boudreau, Bedford, Pa.; John A. Conti, Dothan, Ala.

[73] Assignee: Hedstrom Co., Bedford, Pa.

[22] Filed: Oct. 9, 1973

[21] Appl. No.: 404,150

[52] U.S. Cl. ............... 403/104, 403/110, 403/236, 403/362, 297/195
[51] Int. Cl. .............................................. F16b 7/10
[58] Field of Search ............ 403/236, 362, 104, 83, 403/109, 110; 248/413, 295; 280/287; 297/195

[56] References Cited
UNITED STATES PATENTS

| | | | |
|---|---|---|---|
| 895,409 | 8/1908 | Hallowell | 403/362 |
| 1,045,283 | 11/1912 | Hallowell | 403/362 |
| 1,661,868 | 3/1928 | Armstrong et al. | 248/413 X |
| 2,509,284 | 5/1950 | Allen | 403/104 X |
| 2,842,387 | 7/1958 | Della-Porta | 248/413 X |
| 3,604,734 | 9/1971 | Friedman et al. | 403/104 |

*Primary Examiner*—Geo. V. Larkin
*Attorney, Agent, or Firm*—Cesari and McKenna

[57] ABSTRACT

This saddle support system comprises a tubular saddle pillar, a saddle post which is vertically adjustable within the pillar, a standard nut, a fixture for attaching the nut to the saddle pillar, and a bolt which threads through the nut and engages the saddle post, thereby securing the post to the pillar at a selected height.

7 Claims, 5 Drawing Figures

PATENTED NOV 19 1974 3,849,008

SADDLE SUPPORT SYSTEM

BACKGROUND OF THE INVENTION

This invention relates to saddle support systems used on velocipedes. More specifically, this invention improves upon those systems wherein the saddle, mounted on a saddle post, is vertically adjustable by sliding the post through a tubular saddle pillar. A clamping device is mounted on the saddle pillar which secures the post inside the saddle pillar at a selected height. Until now, the clamping mechanisms used as a part of such systems have not been satisfactory from a cost point of view.

One clamping mechanism currently used to secure the saddle post includes a fitting with internally machined threads mounted onto the saddle pillar. The fitting may be welded to the pillar or retained by a specially formed bracket extending from and integral with the pillar. A bolt threads through the fitting, extends inside the saddle pillar, and engages the saddle post. These clamping devices are expensive to produce since a machining operation is required to produce the special threaded fittings.

Another clamping device currently used is a variable diameter ring which fits around the outside of the pillar and may be adjusted to constrict the diameter of the pillar sufficiently to secure the post to the pillar at the constricted point. This system is costly since it requires that close tolerances be maintained in the manufacturing of the post and pillar and a machining operation may also be required to manufacture the variable diameter ring.

SUMMARY OF THE INVENTION

An object of this invention is to replace the special machine-threaded fittings currently used in velocipede saddle support systems with a standard and inexpensive part.

Another object of this invention is to reduce velocipede assembly costs.

Other objects of the invention will in part be obvious and will in part appear hereinafter.

The system described hereafter includes a standard nut, which is retained by the cage portion of a fixture. The fixture may be attached to the saddle pillar in several different ways as will be described by the different embodiments of this invention. In all of the embodiments, a standard bolt passes through a standard nut and engages the saddle post inside the saddle pillar.

In one embodiment of this system, the fixture has keys which pass through a slot in the saddle pillar and thereby secure the bracket to the pillar. The keys align in the slot so that they automatically position the bracket to be welded or otherwise secured to the pillar.

These keys may be rings inside the pillar which the saddle post passes through. In this embodiment, the post is secured between the bolt and the inside edges of the rings.

In another embodiment, the top ring is enlarged to seat as a cap over the top of the saddle pillar and thereby seal and finish off the end of the pillar.

In yet another embodiment, the rings are large enough to extend around the outside of the saddle pillar. The rings may be welded or otherwise secured to the pillar.

In those cases where the post does not pass through the fixture rings, an insert may be retained inside the pillar, between the pillar and saddle post, to reinforce the pillar at the point where the post is secured to the pillar.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWING

For a fuller understanding of the nature and objects of the invention, reference should be had to the following detailed description taken in connection with the accompanying drawing, in which.

DESCRIPTION OF ILLUSTRATIVE EMBODIMENTS

Figure 1:
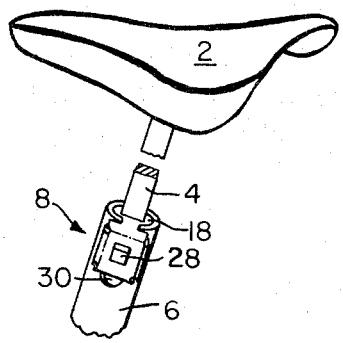
FIG. 1 shows generally the side view of the vehicle saddle and saddle support system.

This saddle support system is shown generally in FIG. 1. A saddle 2 is supported by a saddle post 4 which fits coaxially inside a saddle pillar 6. Saddle height is adjusted by moving the saddle post up and down within the saddle pillar. A clamp assembly used to secure the seat post within the saddle pillar is shown generally at 8 and is hereinafter described in detail.

Figure 2:
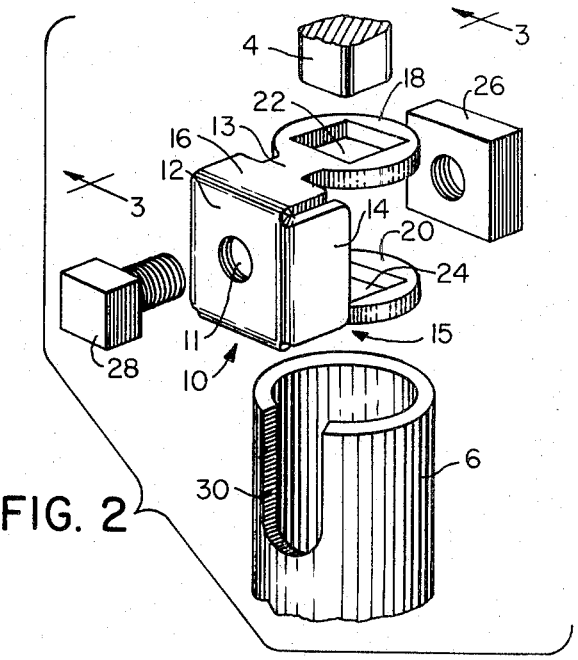
FIG. 2 is an exploded perspective view of the saddle support system shown generally in FIG. 1.

FIG. 2 is an exploded perspective view of the clamp assembly shown generally at 8. The clamp assembly comprises a standard nut 26 and bolt 28 and a fixture shown generally at 15. The fixture comprises cage 10, rings 18 and 20 and two necks, 13, one of which is shown. A slot 30 is located in the end of saddle pillar 6 and is required for assembly of the system. Seat post 4 is shown aligned to pass through rings 18 and 20 and into saddle pillar 6.

Fixture 15 is formed from a generally square stamped metal piece with flaps extending from each edge. The generally square section of the stamped piece forms a face 12 of cage 10. The flaps are bent over at right angles to the face, thus forming the four cage sides 14 and 16, of which one of each is shown. In this embodiment, the cage is shown as a box, completely enclosed on five sides. However, it is not essential to this system that the cage be so enclosed; it is only essential that the cage be of an appropriate construction to restrain the nut and prevent it from moving away from the saddle pillar when the clamp assembly is mounted on the pillar.

Rings 18 and 20 and their connective necks extend from and are coplanar with the top and bottom sides of cage 10. The two rings shown in this embodiment may be two keys of any shape which fit within the saddle pillar and thereby secure the cage to the pillar. Also, openings 22 and 24 inside the rings are shown as square, but they may be of any shape.

Figure 3:
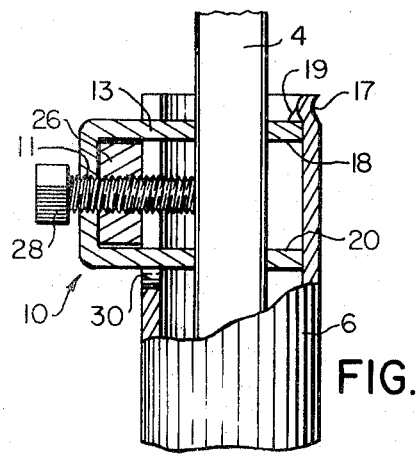
FIG. 3 is a cutaway perspective view of the system shown in FIG. 2.

To assemble the system as shown in FIG. 3, nut 26 is placed inside the cage such that its threaded opening aligns with a clearance hole 11. Bolt 28 passes through the clearance hole and threads into the nut. The necks connecting the cage with the rings are slid through slot 30 such that the rings seat as keys within the saddle pillar, the perimeter of the rings engaging the inside wall of the pillar. Thus, the open side of the cage abuts slot 30 and the outside of the pillar wall.

The rings align vertically with slot 30 and coaxially with pillar 6, with the lower neck 13 resting on the bottom of slot 30. The fixture is secured to the pillar by some suitable means such as a crimp 17 in the pillar above ring 18 or by a spot weld 19 between the ring and the pillar. The rings align the fixture with the slot, so that the fixture may be welded or otherwise secured to the saddle pillar without adjusting its position. This self-aligning action of the fixture eliminates the need for an aligning jig or for manually aligning the cage during assembly.

Saddle post 4 passes through rings 18 and 20. To secure the post at a selected level, bolt 28 is threaded through nut 26 until it presses against post 4, thereby frictionally securing the post between the bolt and the rings. As the bolt is tightened against the saddle post, the sides of the cage enclosure prevent the nut from turning and face 12 of the enclosure prevents the nut from moving away from the saddle pillar.

Figure 4:
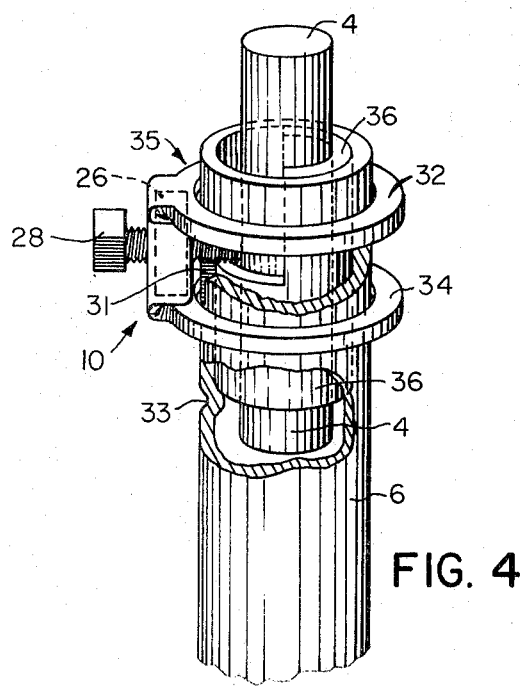
FIG. 4 is an exploded perspective view of an alternate embodiment of the system.

Another embodiment of the saddle support system is shown in FIG. 4. This system is identical to that shown in FIG. 3, except that it comprises a fixture 35 which has no connective necks and rings 32 and 34 which are larger in diameter than rings 18 and 20 in FIG. 3. These rings do not fit as keys inside the saddle pillar. Rather, when this system is assembled, the rings extend so as to engage the outside of the saddle pillar and thereby secure the fixture to the pillar. The rings may be secured to the pillar by spot welding or any other suitable means. In addition, slot 30 may be replaced by a clearance hole 31 or any other opening suitable to allow bolt 28 to pass into the saddle pillar.

A cylindrical insert 36 may be used to reinforce the pillar at the point where the seat post is secured to the pillar. The insert is made from thicker metal than the saddle pillar and fits snugly within the saddle pillar. The insert may be retained inside the pillar by crimp 33 or other suitable means and has a clearance opening sufficient to allow bolt 28 to engage the saddle post. When the insert is used, the saddle post is secured between the bolt and the insert.

If the rings are not welded, crimped or otherwise secured to the saddle pillar, the clamp assembly may be removed by loosening the bolt and sliding the clamp assembly up and over the end of the saddle pillar. The nut may then be replaced if it has been damaged.

Figure 5:
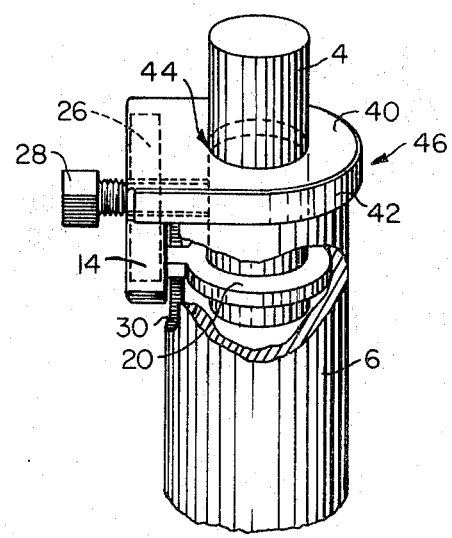
FIG. 5 is a cutaway perspective view of another embodiment of the system.

FIG. 5 shows another embodiment of this system which is identical with that shown in FIG. 3, except that the upper ring in FIG. 3 is replaced by an elliptical tab 46. An opening 44 in a surface 40 of the elliptical tab 46 aligns coaxially with ring 20. The outer edge of the tab is bent over to form a skirt 42 which extends at right angles from surface 40.

When this system is assembled, as shown in the cutaway perspective view of FIG. 5, tab 46 rests as a cap on top of saddle pillar 6 with surface 40 engaging the top of the saddle pillar and skirt 42 engaging the wall of the pillar. Skirt 42 may be spot welded to the saddle pillar or secured to the saddle pillar by any other suitable means.

It will thus be seen that the objects set forth above, among those made apparent from the preceding description are efficiently attained and, since certain changes may be made in the above article without departing from the scope of the invention, it is intended that all matter contained in the above description shall be interpreted as illustrative and not in a limiting sense.

What we claim as new and desired to secure by Letters Patent of the United States is:

1. A saddle support system comprising a cage with an opening into its interior, a nut aligned inside the cage so that its threaded opening is adjacent to the opening in the cage, a bolt passing through the opening in the cage and threading into the nut, a tubular saddle pillar, a saddle post fitting coaxially within the saddle pillar, an opening in the wall of the pillar and wherein the cage is secured to the saddle pillar and the bolt is of sufficient length to thread through the nut, pass through the pillar opening and engage the saddle post, thereby frictionally securing the post at a selected level in the saddle pillar.

2. A saddle support system as defined in claim 1 wherein the cage comprises a box-like enclosure with a face and four sides, the sides extending orthogonally from the face, the securing means comprising two flat keys projecting from and coplanar with two opposing cage sides.

3. A saddle support system as described in claim 2, further comprising a tubular insert within the saddle pillar between the pillar wall and the saddle post, means for retaining the insert, the post being secured between the bolt and tubular insert and, the insert reinforcing the pillar at the point where the post is secured in the pillar.

4. A saddle support system as described in claim 2, wherein each key is a ring.

5. A saddle support system as defined in claim 1 wherein the cage comprises a box-like enclosure with a face and four sides, the sides extending orthogonally from the face, the securing means comprising two flat tabs projecting from and coplanar with two opposite cage sides, one tab being a ring and connective neck and the other being elliptically shaped with an opening aligning coaxially with the ring, the perimeter of the elliptical tab being bent over to form a skirt.

6. A saddle support system as described in claim 1 wherein the cage comprises a box-like enclosure with a face and four sides, the sides extending orthogonally from the face, the securing means comprising two flat, parallel rings projecting from and coplanar with two opposing cage sides.

7. A saddle support system as defined in claim 6 further comprising a tubular insert within the saddle pillar between the pillar wall and the saddle post, means for retaining the insert, the post being secured between the bolt and tubular insert and, the insert reinforcing the pillar at the point where the post is secured in the pillar.

* * * * *